Feb. 4, 1964 P. W. COPPOLA 3,120,255
ELASTIC TIRE CONSTRUCTION
Filed Nov. 1, 1960

INVENTOR
PELLEGRINO WILLIAM COPPOLA
BY
ATTORNEYS.

United States Patent Office 3,120,255
Patented Feb. 4, 1964

3,120,255
ELASTIC TIRE CONSTRUCTION
Pellegrino William Coppola, Montclair, N.J.
(187 Inwood Ave., Upper Montclair, N.J.)
Filed Nov. 1, 1960, Ser. No. 66,659
7 Claims. (Cl. 152—208)

The present invention relates to elastic tires having in its tread traction devices and aims to provide certain improvements in such tires.

The problem of obtaining adequate traction with elastic tires, more particularly pneumatic tires, when driving on roadways covered with ice, snow, sleet and mud is one of long standing and although many and varied devices have been proposed as a solution of said problem, such as tire chains, detachable cleats and pneumatic operable permanently mounted cleats, each of such devices have been found to embody various objections in that they are not available when their need is most urgent or they are difficult to apply, or they require the use of complicated attachments or the use of pneumatically operable means and the concomitant uncertainties of their operation.

The primary object of the present invention is to provide an elastic tire in the tread of which, cleats are disposed normally radially inwardly or substantially flush with the tire tread periphery for use in fair weather, and which cleats can be manually projected to extend outwardly beyond the tread periphery and operate to provide a proper grip on roadways coated with ice, snow, sleet or mud to obtain the necessary traction for the tires to roll over such coated roadways.

A further object of the invention is to provide simple means for manually operating cleats of the character set forth in the preceding paragraph and for holding them in either their projected or retracted positions.

The foregoing and other objects of the invention, not specifically enumerated, I accomplish by forming in the periphery of a tire formed of elastomeric material a plurality of spaced sockets each adapted to accommodate a cleat which is mounted for rotation about an axis, the walls of the sockets, in a circumferential direction, serving as abutments for the cleats when in operative or inoperative relation to the tread periphery, said cleats being mounted on shafts which can be rotated manually to position the cleats in desired relation, the tire and the shafts having cooperating means for holding the cleats in said desired relation. The invention will be better understood from the detailed description which follows when considered in connection with the accompanying drawing showing certain preferred embodiments and wherein:

Figure 1:
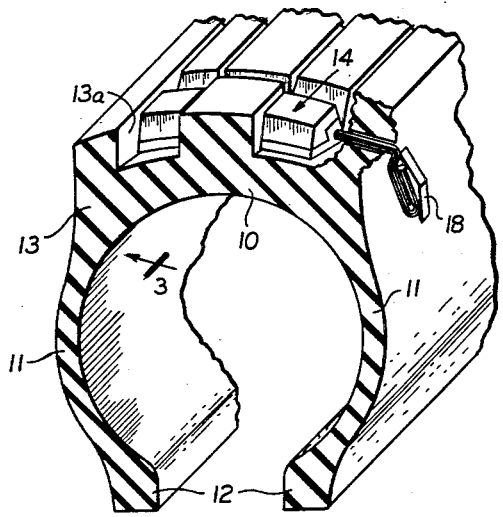
FIG. 1 is a transverse cross-sectional perspective view of a pneumatic tire casing embodying the invention.
Figure 2:
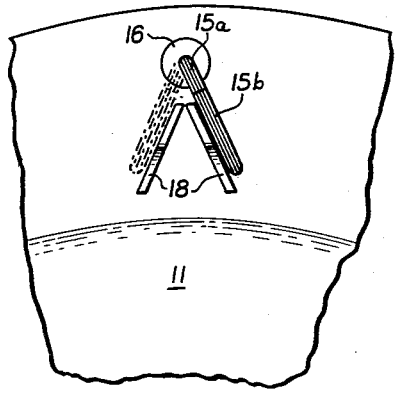
FIG. 2 is a side elevation of the casing shown in FIG. 1.

Referring first to FIGS. 1 to 4 of the drawing, the invention is shown as applied to a pneumatic tire casing of any desired construction having a tread portion 10, side walls 11 and beads 12. Although the periphery of the tread portion may have any configuration it should be formed with a plurality of sockets 13 which may be spaced both laterally and circumferentially of the tread, two of such sockets which are laterally spaced being shown. In each recess there is disposed a cleat 14 which is mounted for rotation about an axis parallel to the axis of the tire.

The sockets 13 and the cleats 14 are so related in both size and shape that in operative position of the cleats, a portion thereof will project outwardly beyond the periphery of the tread surface as shown in dot and dash lines and in the inoperative position, the cleats will be disposed wholly within the confines of the peripheral surface of the tread. More specifically, the sockets 13 are somewhat larger than the cleats and have parallel side walls 13a which extend circumferentially of the tire and axially disposed transverse walls 13b, 13c, and 13d, the walls 13c and 13d being adapted to serve as abutments for the cleats when in operative and inoperative position respectively. As shown, the transverse wall 13b extends substantially radially of the tread and the walls 13c and 13d are disposed substantially perpendicularly to each other. Of course, other axial relationships of the socket walls may be provided depending upon the shape of the cleats.

Figure 3:
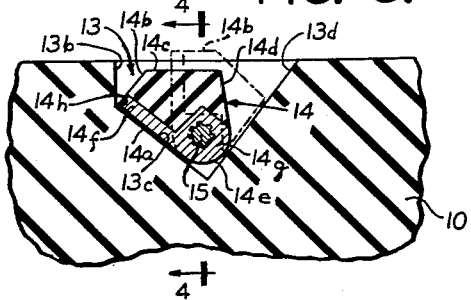
FIG. 3 is a sectional view taken along the line 3—3 of FIG. 1.

The cleats 14 may vary in size and shape and character of material of which they are made and as shown in FIG. 3 the cleat is of substantially pentagonal shape in cross-section circumferentially of the tread and as having flat sides 14a, 14b, 14c, 14d and a curve side 14e replacing the fifth side of the pentagon. The cleats may be made of any desired material such as rubber, metal, fibre, etc., or a combination of such materials. When made primarily of rubber they may be reinforced anteriorly with a metal facing 14f having a lug 14g formed with an axial opening therethrough parallel to the axis of the tire for mounting upon a supporting shaft 15. Preferably the cleat is non-rotatably mounted on the shaft in any desired manner although the shaft is rotatable to move the edge 14h of the cleat at the juncture of the faces 14a and 14b, outwardly of the peripheral surface of the tread, or into inoperative position within the confines of the peripheral surface of the tread. When in operative position, the face 14d of the cleat will abut the wall 13d of the recess so that the edge 14h will bite or dig into the road surface as the tire rotates forwardly. It will also be noted that when the cleat is in operative position the face 14a will abut the wall 13c of the socket and the face 14c of the cleat will lie wholly within the peripheral surface of the tread.

The shaft 15 as herein shown is splined throughout its length and engages in the cleat axial openings which are complementally splined. To provide for rotation of the shafts within the tire tread, the latter may be equipped with smooth-bore bushings 16 extending inwardly from the opposite side faces of the tread. To hold the shafts with the cleats thereon in the tire, the ends of the shafts at the inner side face of the tread may be each provided with a cotter pin 17 or equivalent means. At the outer side face of the tread, the shafts 15 each has a portion 15a extending inwardly toward the axis of the tire and if desired the free end 15b of said portion may be bent back upon itself to provide a better hand engaging portion for manipulating the shafts, and in turn the cleats. Preferably, suitable means are provided at the outer side wall of the tire to hold the manipulating portions of the shafts against accidental shifting so as to maintain the cleats in either retracted or projected relation as desired. As shown, such means are deformable, spaced ribs or ears 18 formed on the side walls of the tire and over which the manipulating portion of the shaft handle may be positioned.

Figure 5:
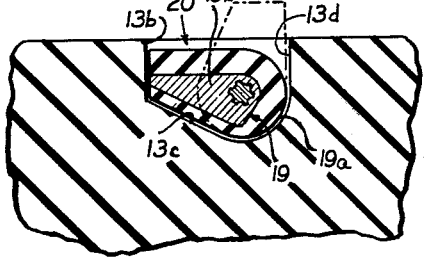
FIG. 5 is a sectional view similar to FIG. 3 showing a modified form of cleat.
Figure 4:
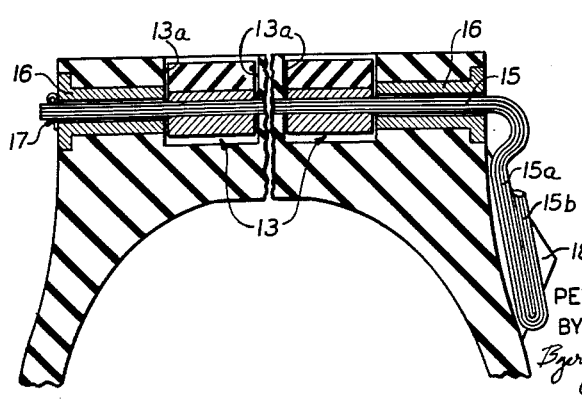
FIG. 4 is a section taken along the line 4—4 of FIG. 3.

In FIG. 5 there is illustrated a slightly different form of cleat 19 which is of substantially trapezium shape in cross-section with one of its sides 19a rounded, the cleat having a hard substantially rigid core 19b mounted on a shaft in a manner analogous to that shown and described with respect to the cleat 14. A socket 20 for accommodating the cleat 19 may also be analogous to the socket 13 and has transverse walls which provide abuments for the sides of the cleat when in either retracted or projected position.

In either embodiment of the invention, the cleats may be readily removed, if desired, by simply withdrawing the cleat supporting shafts after disengaging therefrom the cotter pin 17.

Although I have shown and described certain preferred embodiments of my invention, such disclosure is to be considered only by way of example as it will be understood that changes in details may be made to the tire construction disclosed, within the range of mechanical and engineering skill, without departing from the spirit of the invention as hereinafter claimed.

What I claim is:

1. A tire formed of elastomeric material having in its tread surface a plurality of circumferentially spaced sockets, cleats mounted in said sockets on rotatable shafts which extend substantially parallel to the axis of the tire for rotation about the respective axes of said shafts to selectively present said cleats, in an operative position with a portion thereof projecting outwardly beyond the periphery of the tread surface, and in an inoperative position, disposed wholly within the confines of the sockets in the tread surface, means on said shaft for rotating the cleats and means for holding the cleats in either selected position, comprising a portion of each shaft extending outwardly beyond one side face of the tire and means on said side face of the tire for cooperative engagement with the outwardly extending portion of each shaft.

2. A tire according to claim 1, wherein a transverse wall of each socket provides an abutment for a cleat when in operative position.

3. A tire according to claim 1, wherein the opposing transverse walls of each socket circumferentially of the tread provide abutments for the cleats when in operative and inoperative relation, respectively.

4. A tire according to claim 1, wherein the cleats are mounted non-rotatively on the rotatable shafts.

5. A tire according to claim 4, wherein bearings for the shafts are provided in the tread portion adjacent the side walls of the tire.

6. A tire formed of elastomeric material having in its tread surface a plurality of circumferentially spaced sockets, cleats mounted in said sockets on rotatable shafts which extend across the full width of the cleats, said shafts being rotatable about their respective axes to selectively present said cleats in an operative position with a portion thereof projecting radially outwardly beyond the tread surface or in an inoperative position wholly within the confines of the sockets, means for rotating the shafts and the cleats and for holding the cleats in either selected position, said means comprising a portion of each shaft extending outwardly beyond one side face of the tire and radially inwardly of said side face and means on said side face of the tire for cooperative engagement with the radially inwardly extending portion of each shaft.

7. A tire according to claim 6, wherein the means on the side face of the tire for cooperative engagement with the extending portions of the shaft are deformable ribs.

References Cited in the file of this patent
UNITED STATES PATENTS

| | | |
|---|---|---|
| 1,052,317 | Clement | Feb. 4, 1913 |
| 1,090,410 | Remy et al | Mar. 17, 1914 |
| 1,099,219 | Walters et al. | June 9, 1914 |
| 2,672,903 | Donegan | Mar. 23, 1954 |

UNITED STATES PATENT OFFICE
CERTIFICATE OF CORRECTION

Patent No. 3,120,255                                February 4, 1964

Pellegrino William Coppola

It is hereby certified that error appears in the above numbered patent requiring correction and that the said Letters Patent should read as corrected below.

Column 1, lines 43 and 44, for "inopertive" read -- inoperative --; column 2, line 38, for "operative" read -- inoperative --.

Signed and sealed this 23rd day of June 1964.

(SEAL)
Attest:

ERNEST W. SWIDER
Attesting Officer

EDWARD J. BRENNER
Commissioner of Patents